(12) United States Patent
Su

(10) Patent No.: US 11,554,800 B2
(45) Date of Patent: Jan. 17, 2023

(54) HAND TRUCK

(71) Applicant: Chung-Hsiu Su, Kaohsiung (TW)

(72) Inventor: Chung-Hsiu Su, Kaohsiung (TW)

(*) Notice: Subject to any disclaimer, the term of this patent is extended or adjusted under 35 U.S.C. 154(b) by 740 days.

(21) Appl. No.: 16/542,584

(22) Filed: Aug. 16, 2019

(65) Prior Publication Data

US 2020/0307665 A1 Oct. 1, 2020

(30) Foreign Application Priority Data

Mar. 29, 2019 (TW) .................................. 108203869

(51) Int. Cl.
*B62B 3/02* (2006.01)
*B62B 5/06* (2006.01)

(52) U.S. Cl.
CPC .............. *B62B 3/02* (2013.01); *B62B 5/061* (2013.01); *B62B 5/067* (2013.01)

(58) Field of Classification Search
CPC ............ B62B 3/02; B62B 5/061; B62B 5/067
See application file for complete search history.

(56) References Cited

U.S. PATENT DOCUMENTS

| 5,687,978 A * | 11/1997 | Rhodes | B62B 1/208 |
| | | | 280/30 |
| 8,100,417 B2 * | 1/2012 | Tsai | B62B 1/12 |
| | | | 280/47.371 |
| 2007/0216116 A1 * | 9/2007 | Gallea | B62B 3/007 |
| | | | 280/47.36 |

* cited by examiner

Primary Examiner — Bryan A Evans

(57) ABSTRACT

A hand truck includes a cart base for carrying an article and two handle modules pivotally mounted thereto. When the hand truck is in a first state, the cart base is horizontally positioned and one handle module is pivoted to an upright position. When the hand truck is in a second state, the cart base is kept upright, one of the handle modules is pivoted to a spread position, and the other one of the handle modules is horizontally positioned and cooperates with the cart base to carry the article. When the hand truck is in a platform state, the cart base is horizontally positioned, and the handle modules are pivoted to a downward extending position so that the cart base is away from the ground.

8 Claims, 13 Drawing Sheets

HAND TRUCK

CROSS-REFERENCE TO RELATED APPLICATION

This application claims priority to Taiwanese Invention Patent Application No. 108203869 filed on Mar. 29, 2019.

FIELD

The disclosure relates to a hand truck, more particularly to a hand truck for carrying articles.

BACKGROUND

A hand truck is usually utilized for transporting a relatively large amount of articles that are not convenient for a user to carry by hand. Generally, a conventional hand truck includes a frame for carrying articles, a plurality of wheels mounted to the bottom of the frame, and a handle accessible to the user for moving the hand truck. The articles to be transported are placed on the frame, and the user holds the handle to exert force and to thus move the hand truck.

Hand trucks have many types of structures for carrying differently shaped articles. For example, a hand truck including a frame having a length greater than that of a handle is suitable for carrying articles with a relatively low center of mass, and the frame is suitable for stacking many articles thereon. On the other hand, a hand truck including a handle having a length greater than that of a frame is suitable for carry an article with a relatively high center of mass, e.g., an upright refrigerator or a steel cylinder, and the handle is disposed inclinedly so that the carried articles can lean against the handle. However, each of the abovementioned kinds of hand trucks is not suitable for carrying articles suitable to be carried by the other one of the kinds of hand trucks.

SUMMARY

Therefore, an object of the disclosure is to provide a hand truck capable of alleviating at least one of the drawbacks of the conventional hand trucks.

According to one aspect of the disclosure, a hand truck is provided. The hand truck includes a cart base, two pivot-connectors and two handle modules. The cart base includes a base unit that extends in a longitudinal direction and that has an article-carrying surface adapted to carry an article thereon and a wheel-mounting surface opposite to the article-carrying surface, and a plurality of wheels that are mounted to the wheel-mounting surface.

The pivot-connectors are mounted respectively at two ends of the cart base that are opposite to each other in the longitudinal direction. Each of the pivot-connectors includes a fixing unit mounted fixedly to the cart base and a movable unit pivotable relative to the fixing unit.

Each of the handle modules includes two side rods mounted to the movable unit of a respective one of the pivot-connectors, and a main frame interconnecting the side rods at extremity ends of the side rods away from the movable unit of the respective one of the pivot-connectors. The handle modules are pivotable relative to the cart base such that the hand truck is switchable among a first state, a second state and a platform state.

When the hand truck is in the first state, the base unit is horizontally positioned, the wheel-mounting surface faces the ground, and one of the handle modules is pivoted relative to the base unit to an upright position where said one of the handle modules is kept upright and is accessible for moving the hand truck.

When the hand truck is in the second state, the base unit is kept upright, one of the handle modules is pivoted to the spread position where said one of the handle modules extends away from a corresponding one of the pivot-connectors in the longitudinal direction, and the other one of the handle modules is horizontally positioned and cooperates with the article-carrying surface of the base unit to carry the article.

When the hand truck is in the platform state, the base unit is horizontally positioned, and the handle modules are pivoted toward the wheel-mounting surface to a downward extending position where the handle modules are substantially perpendicular to the longitudinal direction so that the base unit is away from the ground.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
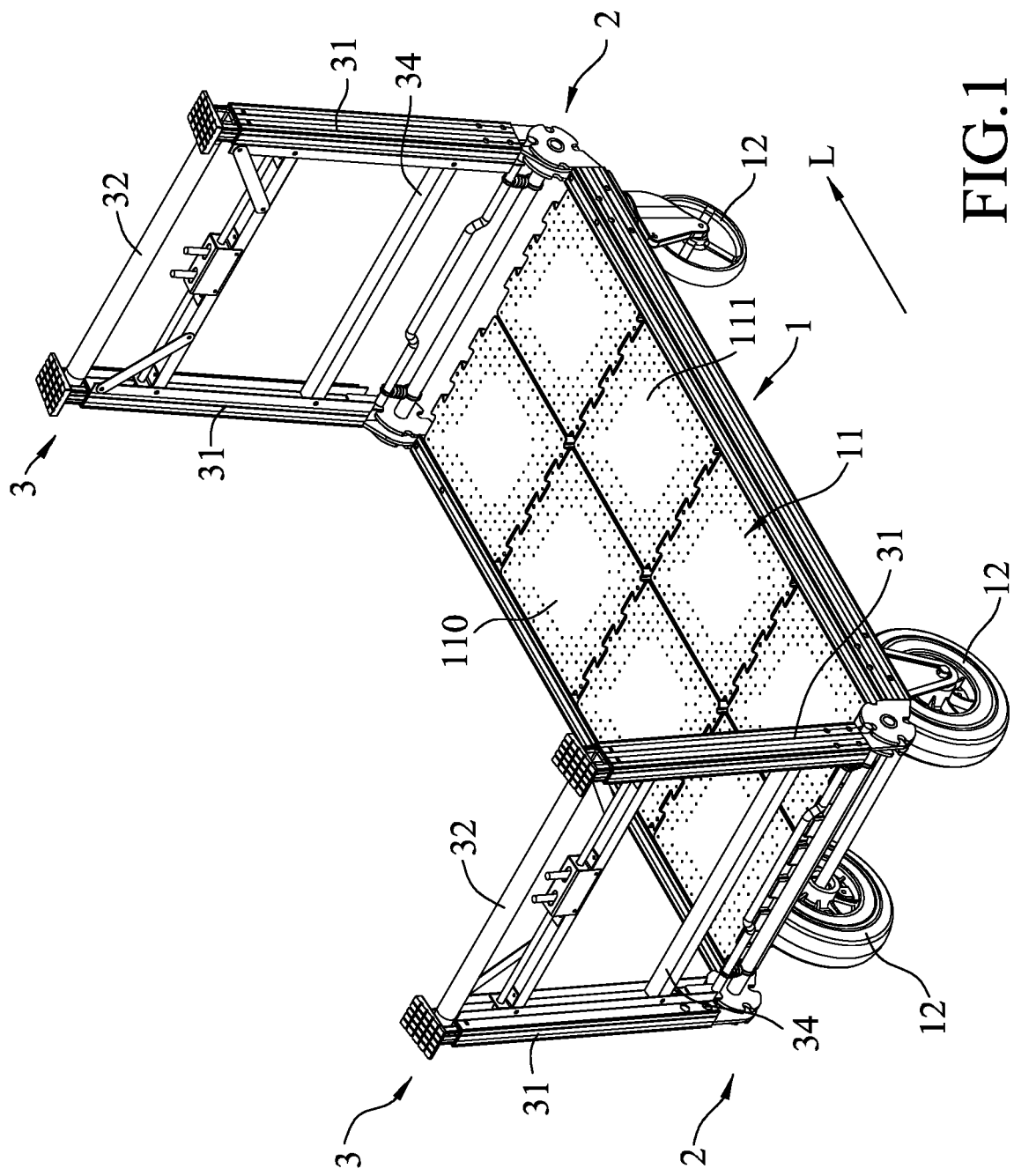
FIG. 1 is a perspective view of a hand truck of one embodiment according to the present disclosure.
Figure 2:
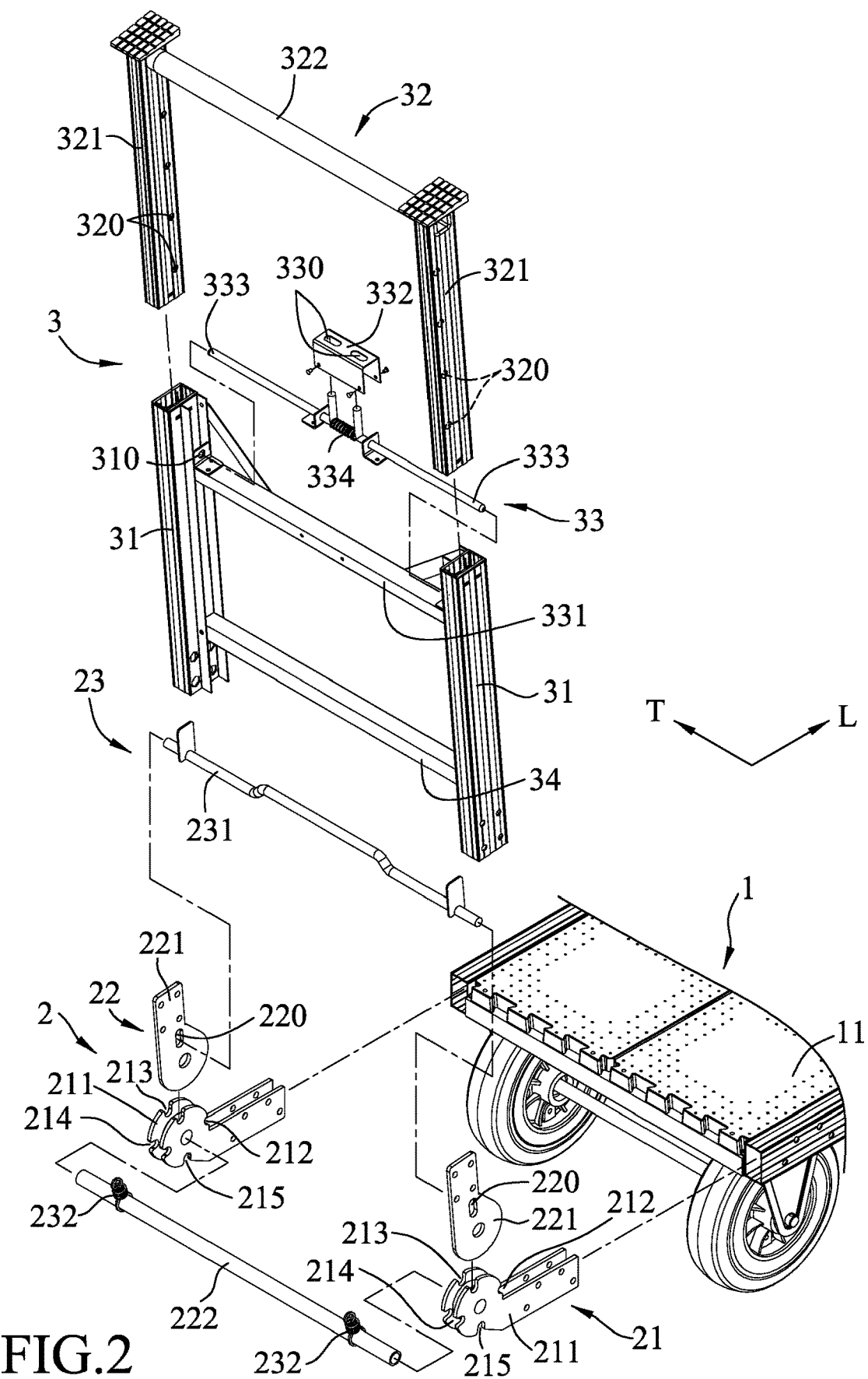
FIG. 2 is a fragmentary exploded perspective view of the hand truck, illustrating one pivot-connector of the hand truck including a fixing unit and a movable unit and one handle module of the hand truck mounted to the movable unit.
Figure 3:
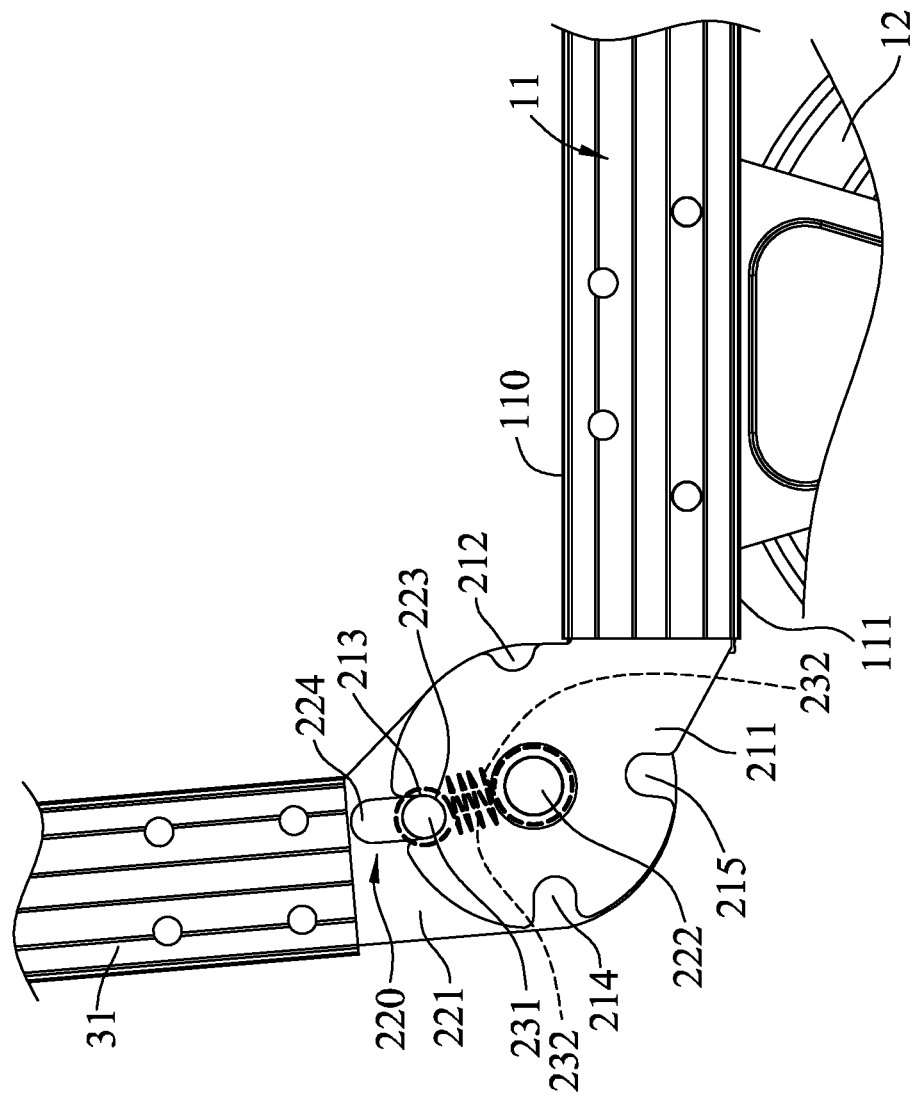
FIG. 3 is a fragmentary schematic side view of the hand truck, illustrating the movable units being not pivotable relative to the fixing units of one of the pivot-connectors.
Figure 4:
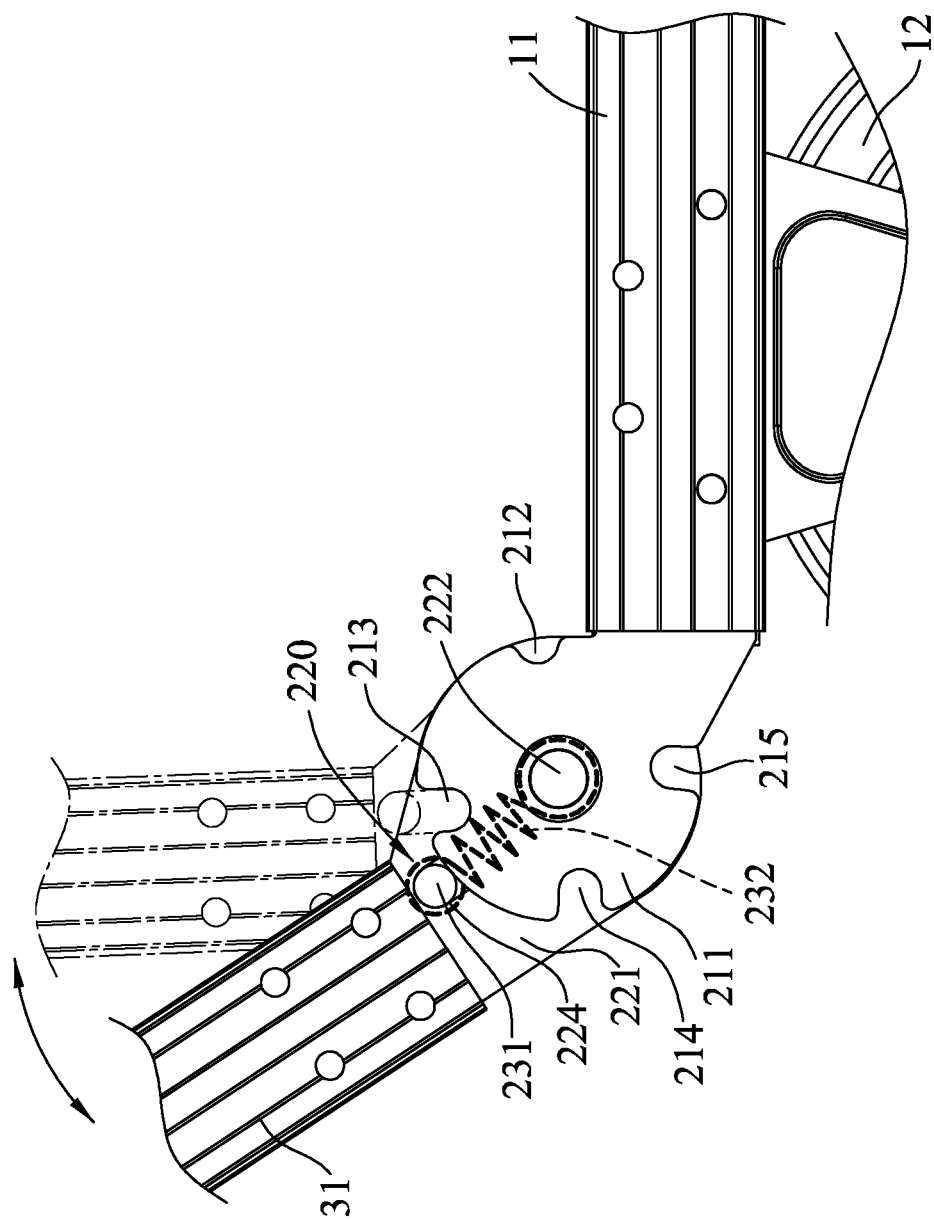
FIG. 4 is a fragmentary schematic side view similar to FIG. 3, illustrating the movable units being pivotable relative to the fixing units of the one of the pivot-connectors to move the handle module mounted thereto to different positions.

Referring to FIGS. 1-4, an embodiment of a hand truck according to the disclosure includes a cart base 1, two pivot-connectors 2 and two handle modules 3. The cart base 1 includes a base unit 11 and a plurality of wheels 12. The base unit 11 extends in a longitudinal direction (L) and has an article-carrying surface 110 adapted to carry an article (not shown) thereon, and a wheel-mounting surface 111 opposite to the article-carrying surface 110. In this embodiment, the number of the wheels 12 is four and the wheels 12 are mounted to the wheel-mounting surface 111.

The pivot-connectors 2 are mounted respectively at two ends of the base unit 11 that are opposite to each other in the longitudinal direction (L). Each of the pivot-connectors 2 includes a fixing unit 21 mounted fixedly to the base unit 11, a movable unit 22 pivotable relative to the fixing unit 21, and a limiting unit 23.

The fixing unit 21 of each of the pivot-connectors 2 includes two fixed members 211 that are connected fixedly to the base unit 11 and that are spaced apart from each other in a transverse direction (T) transverse to the longitude direction (L). Each of the fixed members 211 is formed with a first open-ended slot 212, a second open-ended slot 213, a third open-ended slot 214 and a fourth open-ended slot 215 angularly and equidistantly spaced apart from one another. The first open-ended slots 212 of the fixing members 211 of one of the pivot-connectors 2 face the first open-ended slots 212 of the other one of the pivot-connectors 2, respectively in the longitudinal direction (L).

The movable unit 22 of each of the pivot-connectors 2 includes two movable elements 221, and a connecting rod 222 pivotally connecting the movable elements 221 respectively to the fixed members 211 of the pivot-connector 2. Each of the movable elements 221 is formed with an elongated slot 220 including a limiting slot portion 223 and a non-limiting slot portion 224 opposite to the limiting slot portion 223.

The limiting unit 23 of each of the pivot-connectors 2 includes an insertion rod 231 having opposite ends inserted respectively into the elongated slots 220 of the movable elements 221, and two biasing members 232 connected between the insertion rod 231 and the connecting rod 222. The insertion rod 231 of each of the limiting units 23 of the pivot-connectors 2 is movable relative to the movable elements 221 between the limiting slot portions 223 (see FIG. 3) and the non-limiting slot portions 224 (see FIG. 4) of the elongated slots 220, and the biasing members 232 bias the insertion rod 231 to the limiting slot portions 223.

For each of the pivot-connectors 2, the biasing members 232 are disposed respectively at the opposite ends of the insertion rod 231 for biasing the opposite ends of the insertion rod 231 respectively toward the limiting slot portions 223 of the elongated slots 220. The insertion rod 231 is operable (e.g., manually by a user) to move against the biasing force of the biasing members 232 to the non-limiting slot 224 when the handle modules 3 are desired to be allowed to pivot relative to the base unit 11 of the cart base 1.

It should be noted that, for each of the pivot-connectors 2, the number of the biasing members 232 is not limited to two, and the present disclosure may include only one biasing member mounted in the middle of the connecting rod 222 for biasing the insertion rod 231 toward the limiting slot portions 223.

Each of the handle modules 3 includes two side rods 31 that are respectively mounted to the movable elements 221 of the movable unit 22 of a respective one of the pivot-connectors 2, a main frame 32 that extends in the transverse direction (T) and that interconnects the side rods 31 at extremity ends of the side rods 31 away from the movable unit 22 of the respective one of the pivot-connectors 2, a positioning unit 33 that is mounted between the side rods 31, and an auxiliary frame 34 that interconnects the side rods 31 and that is disposed proximate to the insertion rod 231 of the respective one of the pivot-connectors 2.

Figure 5:
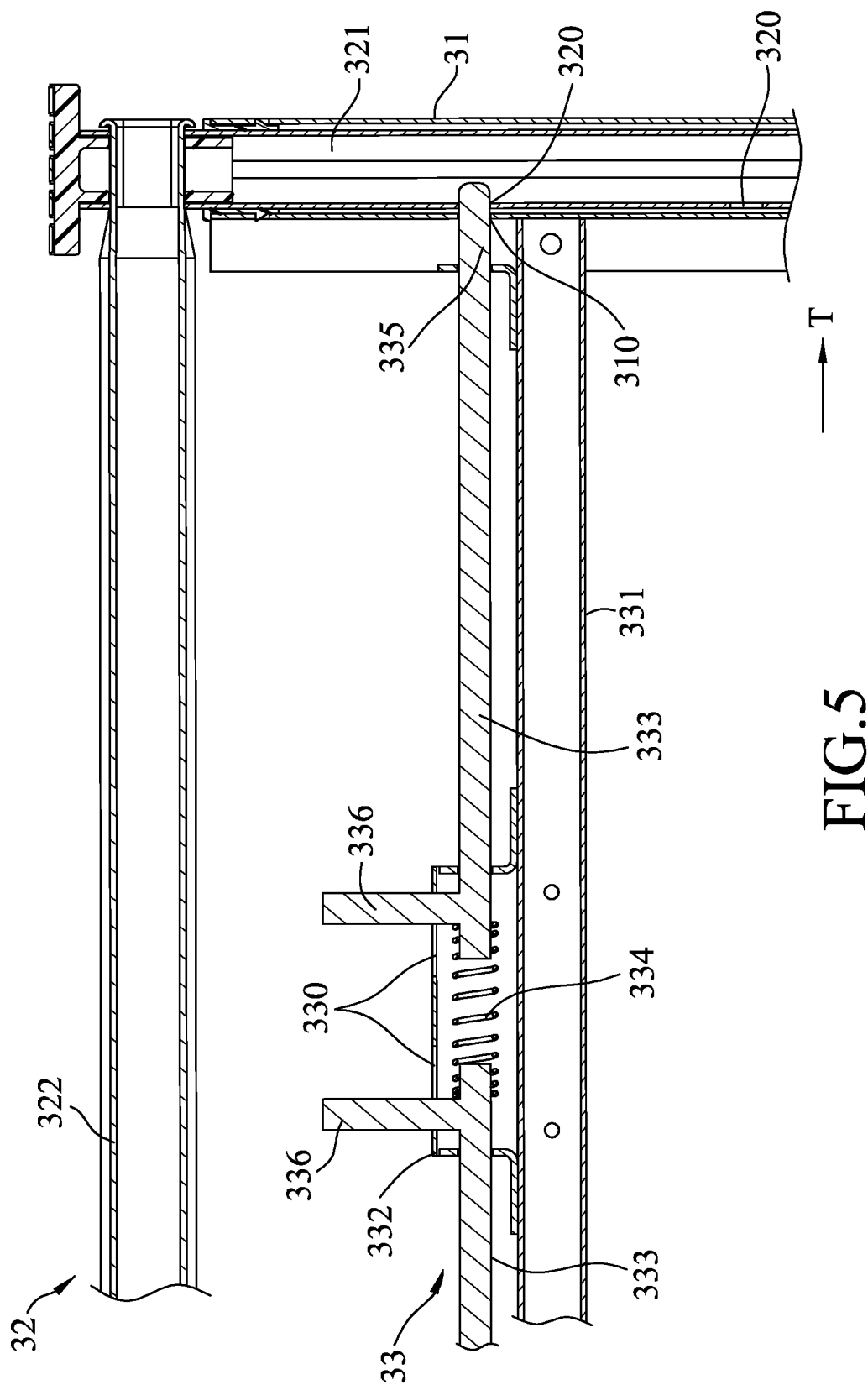
FIG. 5 is a fragmentary schematic front view of the hand truck, illustrating length adjustment to the handle module being prevented.
Figure 6:
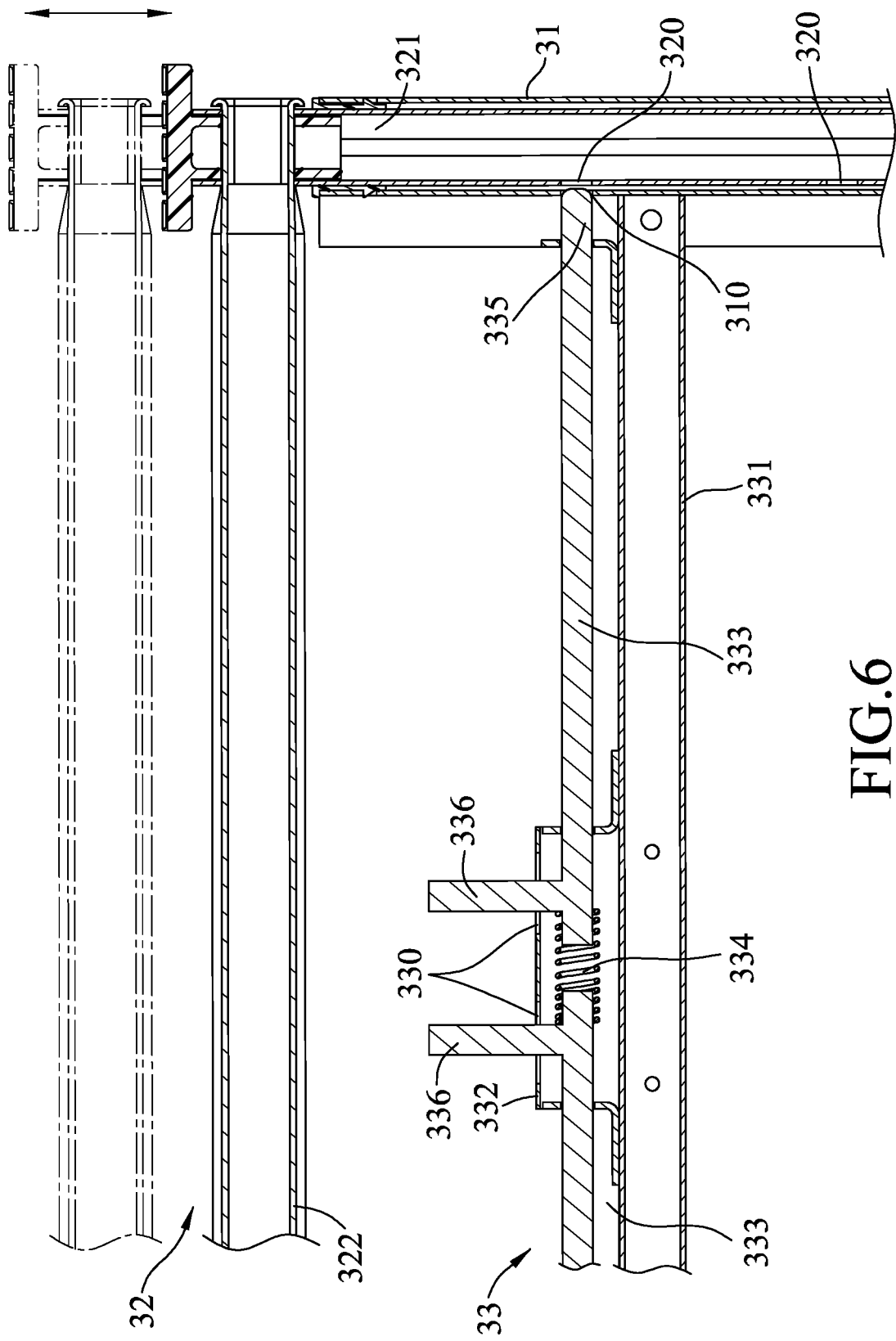
FIG. 6 is similar to FIG. 5, but illustrating length adjustment to the handle module being allowed.

Further referring to FIGS. 5 and 6, the main frame 32 of each of the handle modules 3 includes two side segments 321 telescopically and respectively connected to the side rods 31, and a handle segment 322 connected between the side segments 321. Each of the side segments 321 is formed with a plurality of segment holes 320 spaced apart from one another in a direction along which the side segment 321 extends. Each of the side rods 31 is formed with a rod hole 310.

For each of the handle modules 3, the side segments 321 are movable telescopically and respectively relative to the side rods 31, as indicated by a double headed arrow shown in FIG. 6, to align a selected one of the segment holes 320 of each of the side segments 321 to the rod hole 310 of the respective one of the side rods 31 in the transverse direction (T), so that the length of each of the handle module 3 can be adjusted as required.

The positioning unit 33 of each of the handle modules 3 includes a mounting seat 331 connected between the side rods 31, a cover 332 mounted on the mounting seat 331, two positioning rods 333 spaced apart from one another in the transverse direction (T), mounted to the mounting seat 331 and movable between a fixed position (see FIG. 5) and an adjustable position (see FIG. 6), and a biasing member 334 mounted between and connected to the positioning rods 333 for biasing the positioning rods 333 to the fixed position.

Specifically, each of the positioning rods 333 includes an engaging segment 335 extending in the transverse direction (T) and an operating segment 336 connected to the engaging segment 335 and extending in a direction transverse to the transverse direction (T). For the positioning rods 333 in the fixed position, the engaging segment 335 of each positioning rod 333 extends into the rod hole 310 of a corresponding one of the side rods 31 and the selected one of the segment holes 320 of the respective one of the side segments 321 so as to prevent the side segments 321 from moving respectively relative to the side rods 31. The operating segments 336 of the positioning rods 333 are operable (e.g., manually by the user) to respectively move the engaging segments 335 against a biasing force of the biasing member 334 to move the positioning rods 333 to the adjustable position. In this embodiment, the cover 332 is formed with two cover openings 330 allowing the operating segments 336 to extend therethrough and to be movable in the transverse direction (T) therein. For the positioning rods 333 in the adjustable position, the engaging segments 335 are moved toward each other to disengage from the segment holes 320 to allow the side segments 321 to move respectively relative to the side rods 31. When the positioning rods 333 are moved to a desired position, where the engaging segment 335 of each positioning rod 333 is aligned with the rod hole 310 of the corresponding one of the side rods 31 and another selected one of the segment holes 320 of the respective one of the side segments 321, the operating segments 336 are then released so that the biasing member 334 bias the positioning rods 333 back to the fixed position.

In this embodiment, the biasing members 232 are extension springs and the biasing member 334 of the positioning unit 33 of each of the handle modules 3 is a compression spring, but the present disclosure is not limited to the disclosure herein.

The hand truck of the present disclosure is switchable among a first state, a second state, a third state, a fourth state, a platform state, and a collapsed state by pivoting one or both of the handle modules 3 relative to the base unit 11. Each of the handle modules 3 is pivotable relative to the base unit 11 to an upright position, a spread position, a downward extending position, and a collapsed position. The pivot movement of each the handle modules 3 relative to the base unit 11 is prevented when the insertion rod 231 of the respective one of the pivot-connectors 2 extends through the limiting slot portions 223 of the respective one of the movable units 22 and allowed when the insertion rod 231 of the respective one of the pivot-connectors 2 extends through the non-limiting slot portion 224 of the respective one of the movable units 22. Further details of the handle modules 3 in different positions will be described in the following with reference to FIGS. 7-13.

The hand truck is switched among the first to the fourth states, the platform state, and the collapsed state, by operating the handle modules 3 to pivot to one of the above-mentioned positions where each of the insertion rods 231 of the pivot-connectors 2 engages a selected one of the pairs of the first to the fourth open-ended slots 212-215 of the fixed members 211 of a respective one of the fixing units 21. Note that the insertion rods 231 of the pivot-connectors 2 may engage different ones of the pairs of the first to the fourth open-ended slots 212-215 of the fixed members 211 of the pivot connectors 2.

Specifically, to switch the hand truck to different states, the insertion rod 231 of one of the pivot-connectors 2 is first pulled against the biasing force of the biasing members 232 to move opposite ends of the insertion rod 231 from the limiting slot portions 223 (see FIG. 3) to the non-limiting slot portions 224 (see FIG. 4) of the movable elements 221 of said one of the pivot-connectors 2, then the movable elements 221 of said one of the pivot-connectors 2 are allowed to pivot relative to the respective one of the fixed members 211 to align the limiting slot portions 223 of the movable elements 221 of said one of the pivot-connectors 2 with a selected one of the pairs of the first to fourth open-ended slots 212-215 of the fixed members 211 of said one of the pivot-connectors 2 in the transverse direction (T). Then, the insertion rod 231 being pulled is released and a restoring force provided by the biasing members 232 biases the opposite ends of the insertion rod 231 back to the limiting slot portions 223.

Figure 7:
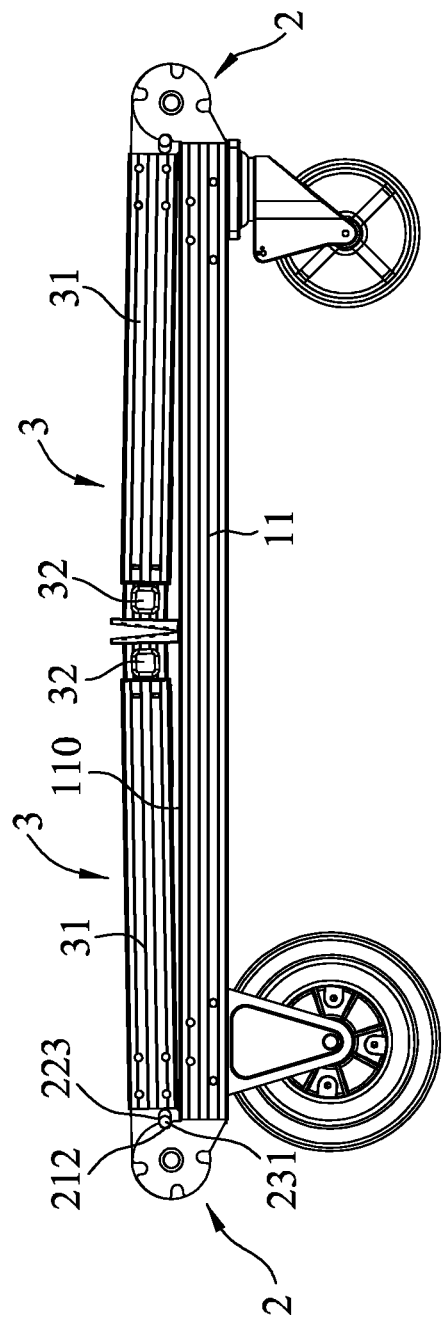
FIG. 7 is a schematic side view of the hand truck in a collapsed state, illustrating both of the handle modules being overlaid on a cart base of the hand truck.

Referring to FIG. 7, when not in use, the hand truck can be switched to the collapsed state in which the base unit 11 is horizontally positioned, and the handle modules 3 are pivoted toward the article-carrying surface 110 to the collapsed position where the side rods 31 and the main frame 32 are horizontally positioned and are overlaid on the article-carrying surface 110. For each of the handle modules 3 in the collapsed position with respect to the respective one of the pivot-connectors 2, the limiting slot portion 223 of each of the movable elements 221 is aligned with the first open-ended slot 212 of the respective one of the fixed members 211 in the transverse direction (T), and the opposite ends of the insertion rod 231 engage respectively the first open-ended slots 212 of the fixed members 211, and extend respectively through the limiting slot portions 223 of the elongated slots 220 so as to prevent the handle module 3 from pivoting relative to the base unit 11. In this way, the hand truck of the present disclosure occupies a relatively small room for storage.

Figure 8:
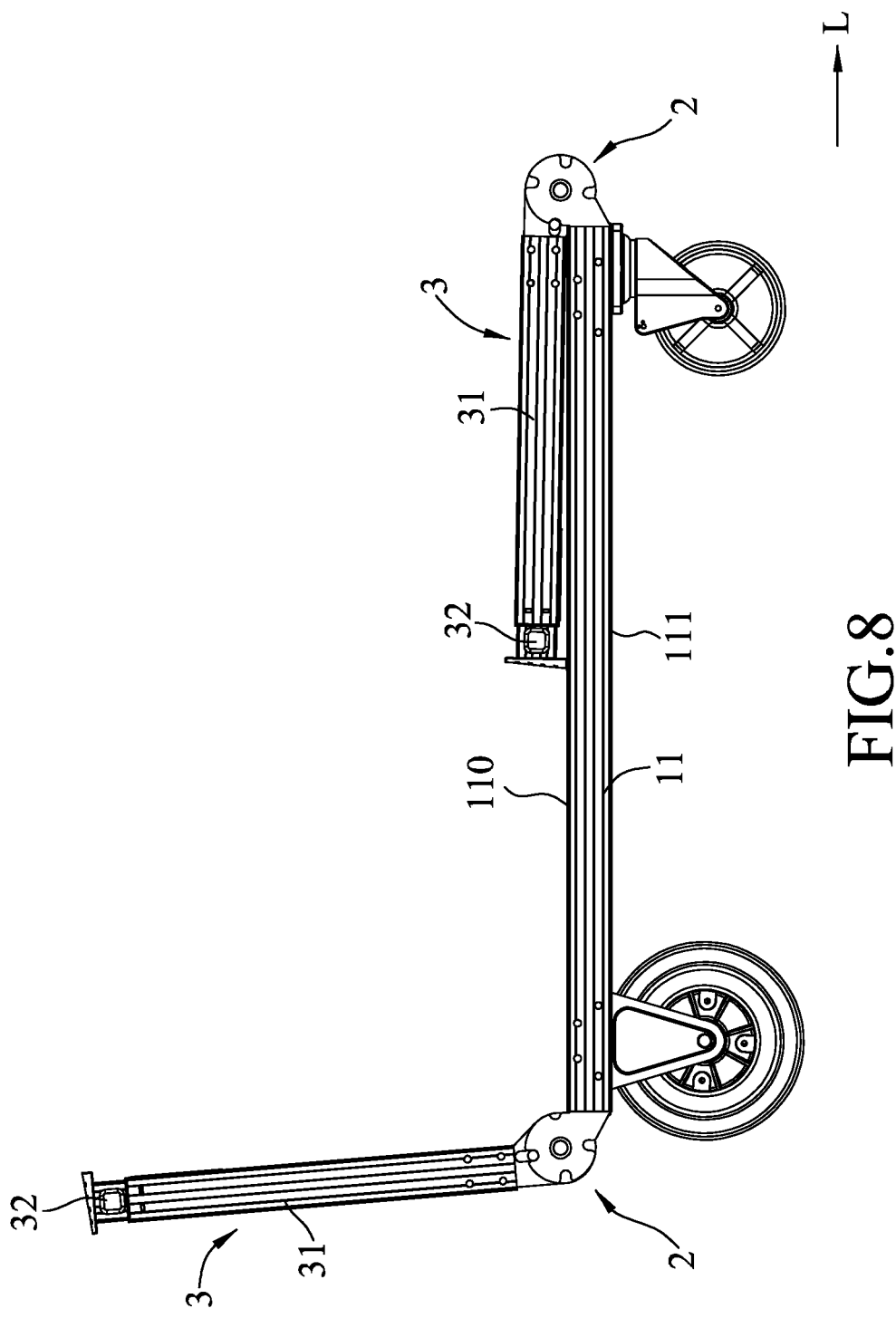
FIG. 8 is a schematic side view of the hand truck in a first state, illustrating one of the handle modules being pivoted to an upright position.

Referring to FIG. 8, when the hand truck is in the first state, the base unit 11 is horizontally positioned, the wheel-mounting surface 111 faces the ground, and (the left) one of the handle modules 3 is pivoted relative to the base unit 11 to the upright position where the one of the handle modules 3 is kept upright and is accessible for moving the hand truck and the other one of the handle modules 3 is in the collapsed position. For the one of the handle modules 3 in the upright position, the side rods 31 extend upright from a corresponding one of the pivot-connectors 2, and the main frame 32 is away from the article-carrying surface 110 and is accessible for moving said hand truck. Referring back to FIG. 3, for the one of the handle modules 3 in the upright position with respect to the corresponding one of the pivot-connectors 2, the limiting slot portion 223 of each of the movable elements 221 of the corresponding one of the pivot-connectors 2 is aligned with the second open-ended slot 213 of the respective one of the fixed members 211 in the transverse direction (T), and the opposite ends of the insertion rod 231 engage respectively the second open-ended slots 213 of the fixed members 211, and extend respectively through the limiting slot portions 223 of the elongated slots 220 so as to prevent the handle module 3 from pivoting relative to the base unit 11.

Figure 9:
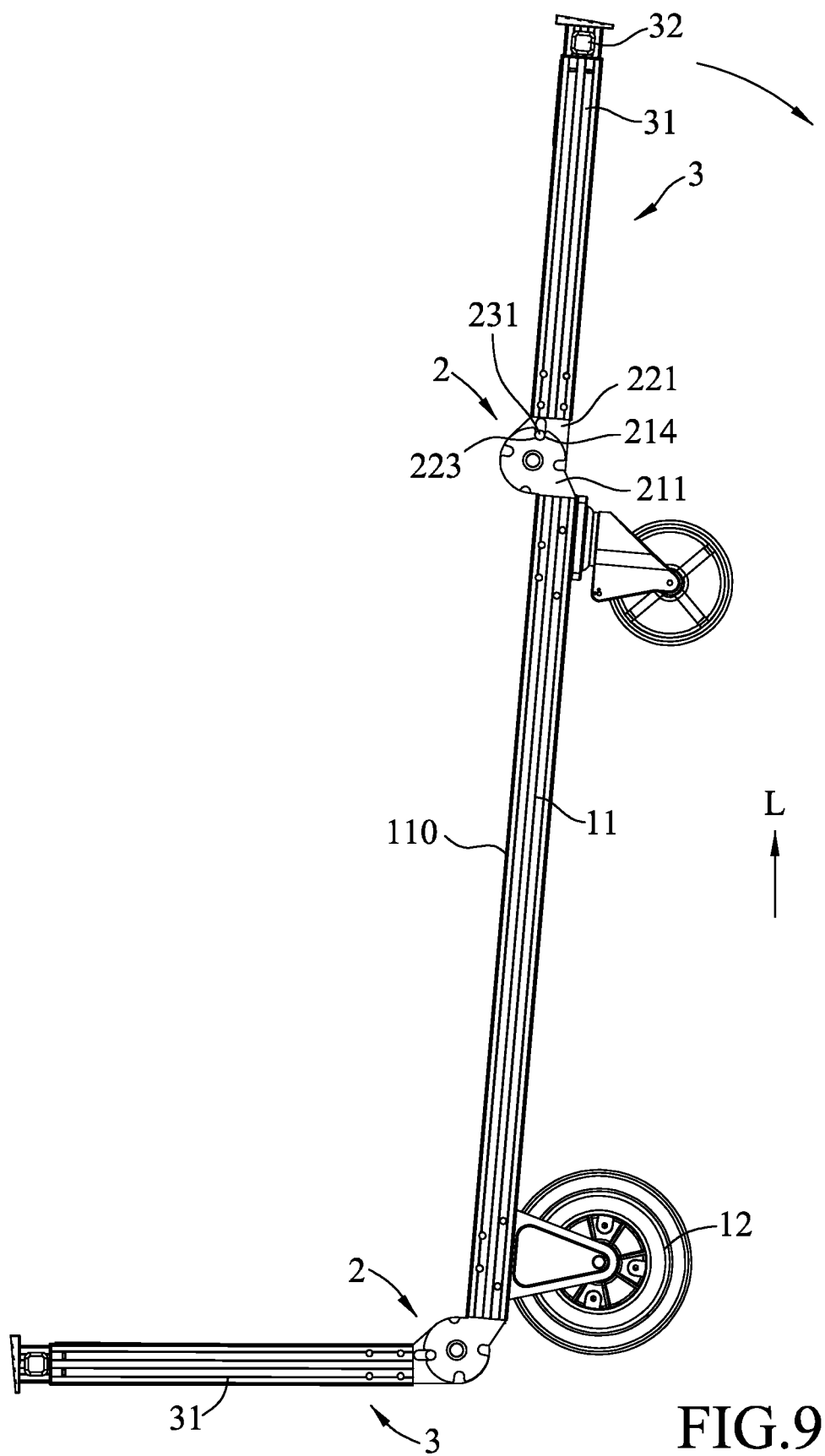
FIG. 9 is a schematic side view of the hand truck in a second state.

Referring to FIG. 9, when the hand truck is switched to the second state, the base unit 11 is kept upright, one of the handle modules 3 is pivoted to the spread position where said one of the handle modules 3 extends away from a corresponding one of the pivot-connectors 2 in the longitudinal direction (L) and is accessible for moving the hand truck, and the other one of the handle modules 3 is horizontally positioned and cooperates with the article-carrying surface 110 of the base unit 11 to carry the article. Specifically, the side rods 31 of said one of the handle modules 3 extend away from the other one of the handle modules 3 in the longitudinal direction (L) and the main frame 32 of said one of the handle modules 3 is accessible for moving the hand truck. For said one of the handle modules 3 in the spread position with respect to the corresponding one of the pivot-connectors 2, the limiting slot portion 223 of each of the movable elements 221 are aligned with the third open-ended slot 214 of the respective one of the fixed members 211 in the transverse direction (T), and the opposite ends of the insertion rod 231 engage respectively the third open-ended slots 214 of the fixed members 211, and extend respectively through the limiting slot portions 223 so as to prevent the handle module 3 from pivoting relative to the base unit 11. In this way, an article with a relatively high center of mass, e.g., an upright refrigerator or a steel cylinder, can be transported by the hand truck in the second state.

Figure 10:
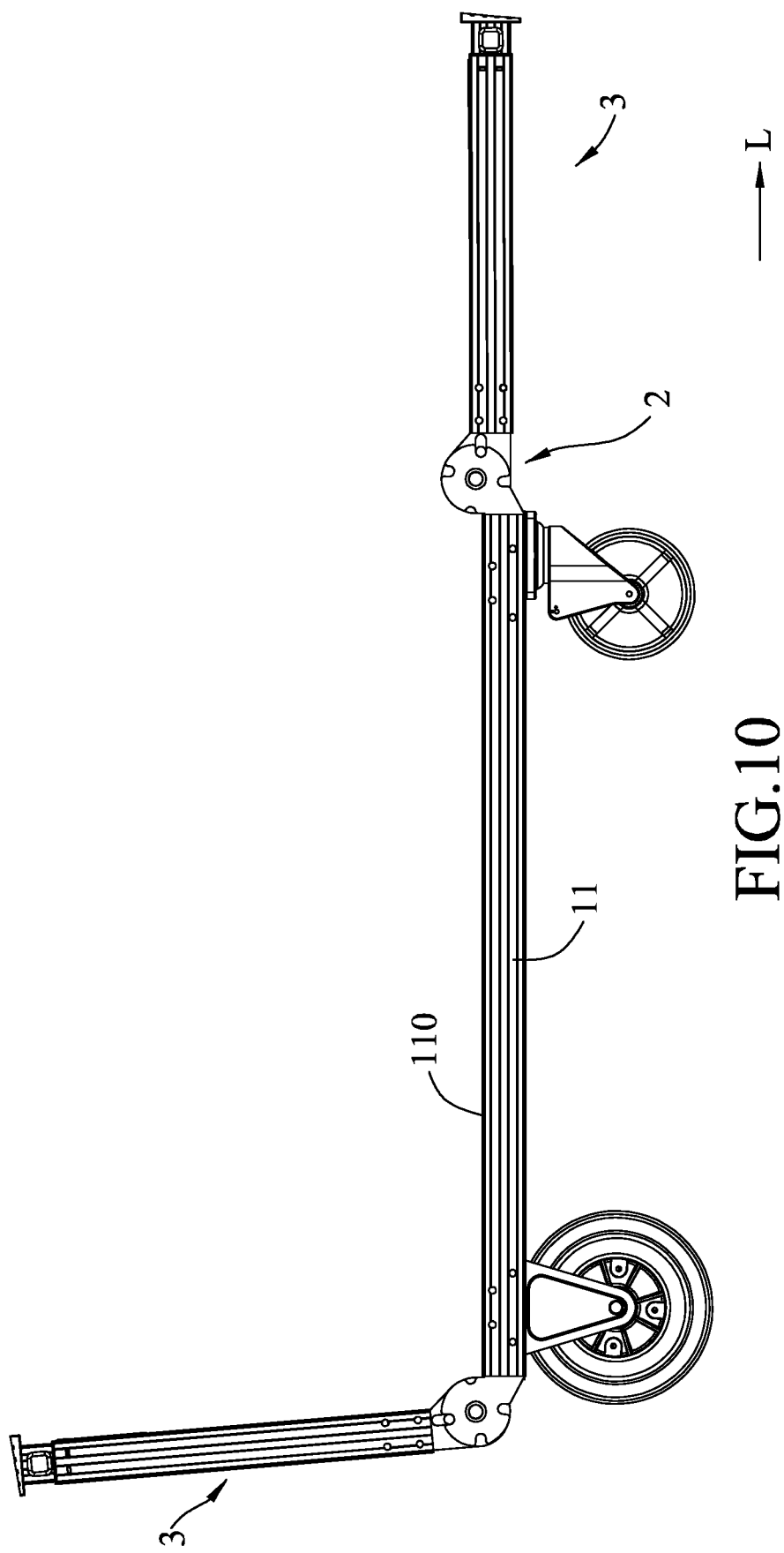
FIG. 10 is a schematic side view of the hand truck in a third state.

Referring to FIG. 10, when the hand truck is in the third state, the base unit 11 is horizontally positioned, one of the handle modules 3 is pivoted to the spread position and cooperates with the article-carrying surface 110 to carry an article, and the other one of the handle modules 3 is pivoted to the upright position. As compared to the hand truck in the first state shown in FIG. 8, the hand truck in the third state is capable of transporting an article having a relatively long length in the longitudinal direction (L) since the auxiliary frame 34 (see FIG. 1) of said other one of the handle modules 3 cooperates with the side rods 31 to function as a surface which in combination with the article-carrying surface 110 forms a larger platform for carrying the article.

Figure 11:
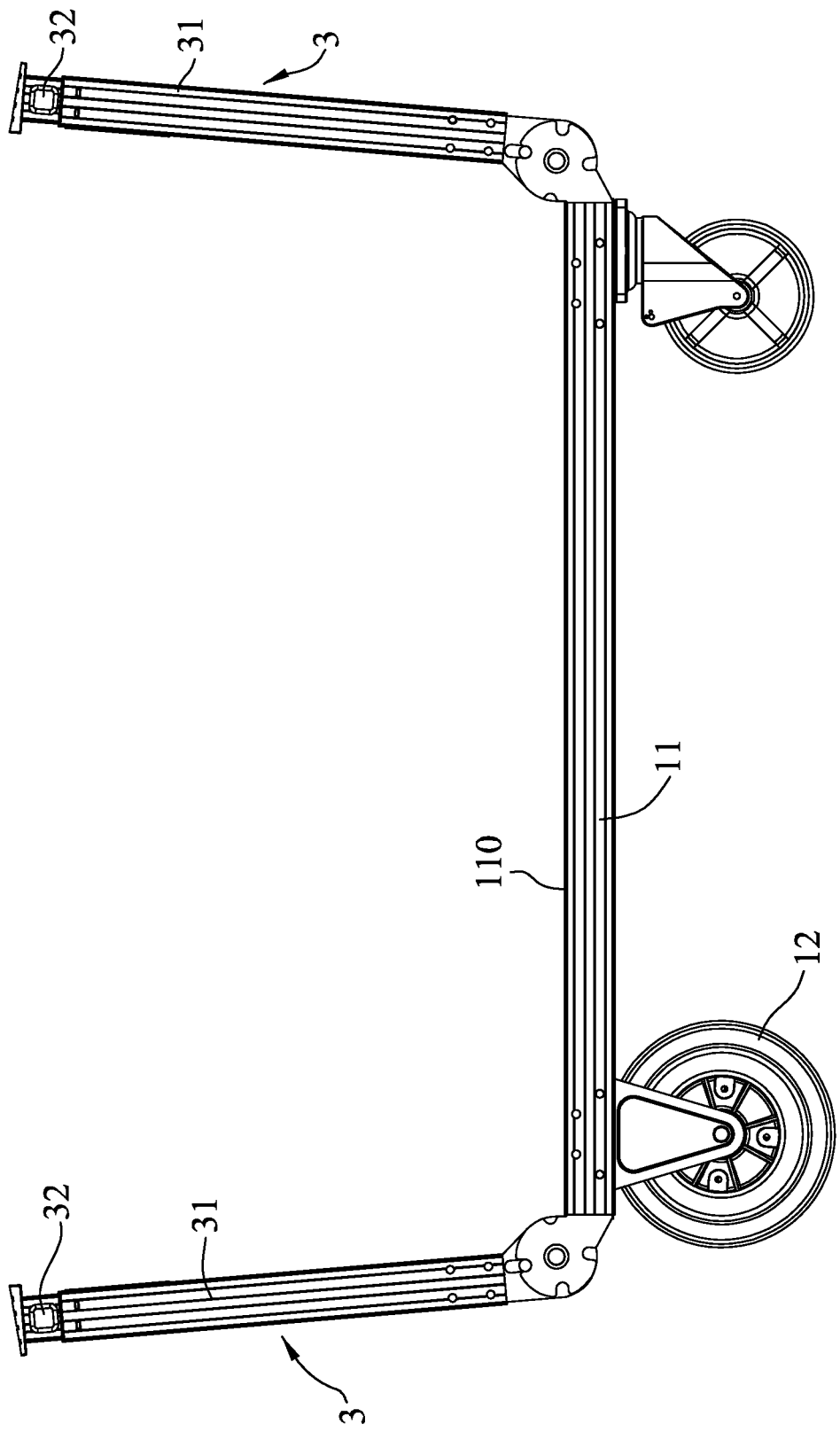
FIG. 11 is a schematic side view of the hand truck in a fourth state, illustrating both of the handle modules being pivoted to the upright position.

Referring to FIG. 11, when the hand truck is in the fourth state, the base unit 11 is horizontally positioned and both of the handle modules 3 are pivoted to the upright position. When the hand truck in the fourth state is traveling on an inclined surface such as a ramp, the main frame 32 of one of the handle modules 3 is accessible for moving the hand truck and the other one of the handle modules 3 is provided as a barrier to prevent the articles carried by the hand truck from falling off the article-carrying surface 110. Referring back to FIG. 1, the auxiliary frame 34 of said other one of the handle modules 3 cooperates with the side rods 31 to prevent articles from falling off the hand truck.

Figure 12:
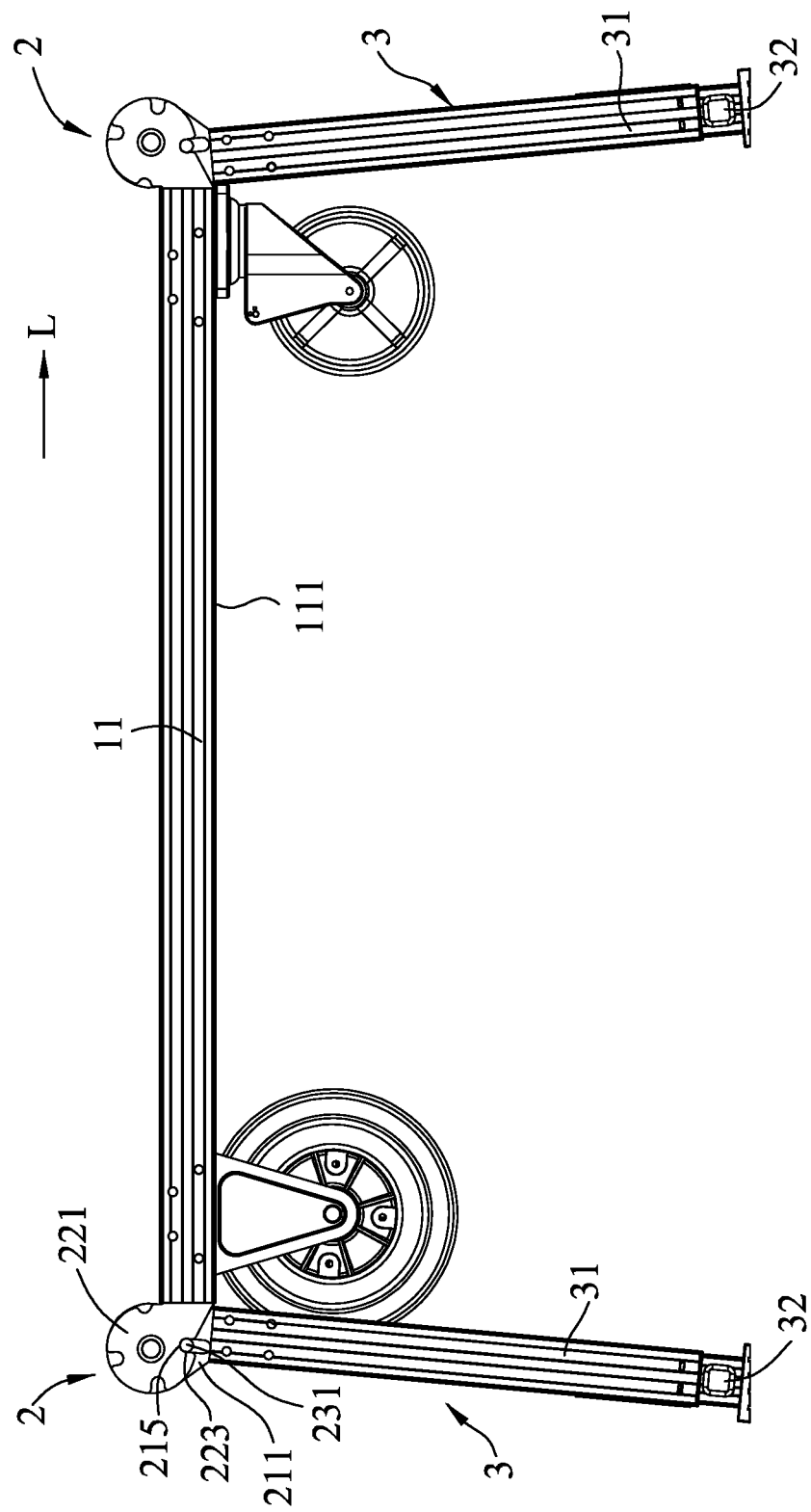
FIG. 12 is a schematic side view of the hand truck in a platform state, illustrating both of the handle modules being pivoted to a downward extending position.
Figure 13:
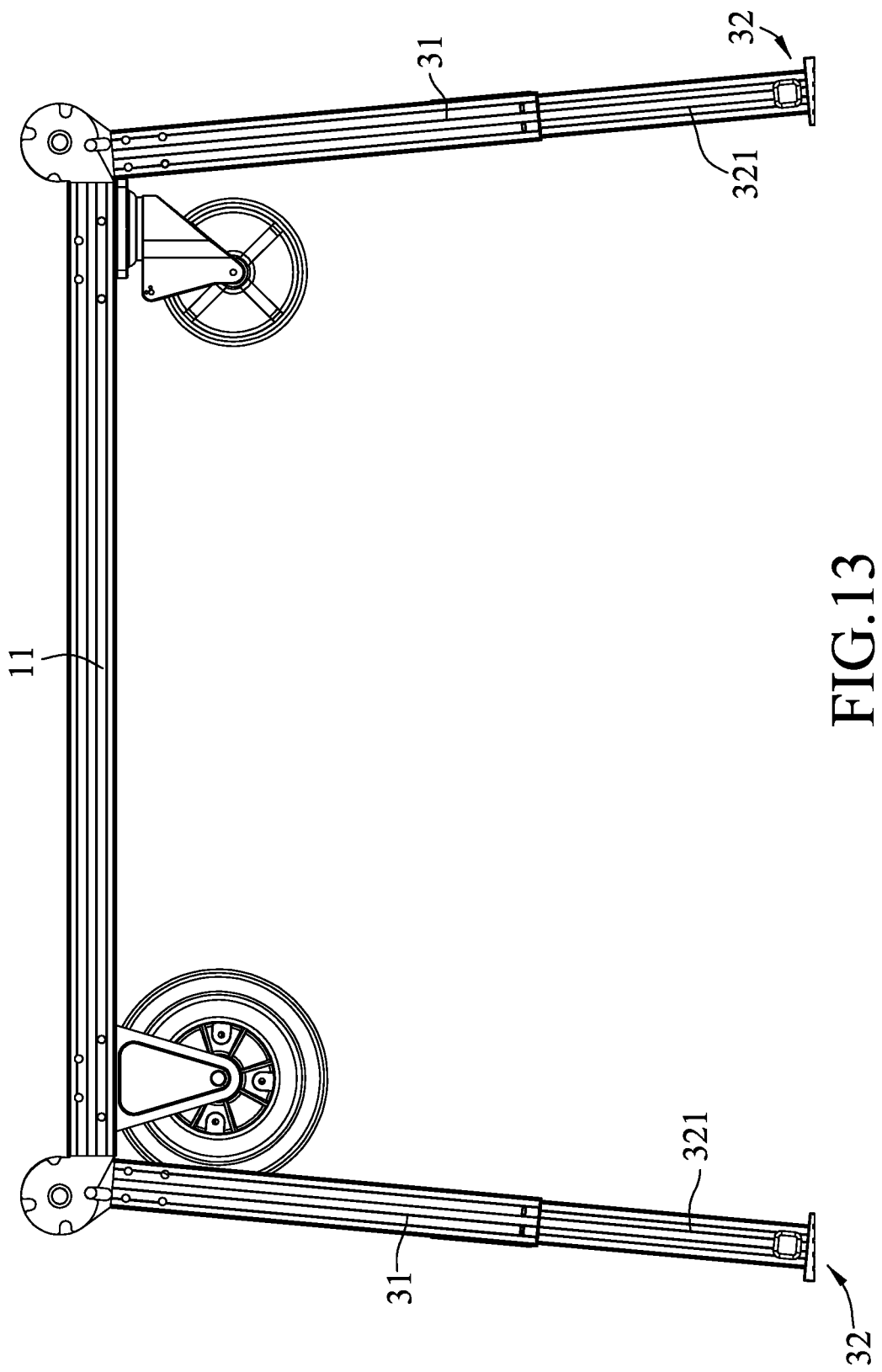
FIG. 13 is similar to FIG. 12, illustrating length of each of the handle modules being adjusted.

Referring to FIG. 12, when the hand truck is in the platform state, the base unit 11 is horizontally positioned, and the handle modules 3 are pivoted toward the wheel-mounting surface 111 to a downward extending position where both of the handle modules 3 are substantially perpendicular to the longitudinal direction (L). For each of the handle modules 3 in the downward extending position, the side rods 31 extend downward from the respective one of the pivot-connectors 2, and the side rods 31 and the base unit 11 are supported by the main frame 32. For each of the handle modules 3 in the downward extending position with respect to the respective one of the pivot-connectors 2, the limiting slot portion 223 of each of the movable elements 221 is aligned with the fourth open-ended slot 215 of the respective one of the fixed members 211 in the transverse direction (T), and the opposite ends of the insertion rod 231 engage respectively with the fourth open-ended slots 215 of the fixed members 211 and extend respectively through the limiting slot portions 223 of the elongated slots 220 so as to prevent the handle module 3 from pivoting relative to the base unit 11. In this way, the hand truck in the platform state can serve as a table. Since the side segments 321 are movable telescopically and respectively relative to the side rods 31, a length of each of the handle modules 3 is adjustable. Further referring to FIG. 13, the side segments 321 can be operated to extend outwardly from the respective one of the side rods 31, so that the height of the base unit 11 relative to the ground can be adjusted as desired. Note that in this embodiment, an included angle defined between each of the handle modules 3 and the base unit 11 is an obtuse angle when the hand truck is in the platform state and thus the base unit 11 is supported by the main frames 32 in a relatively stable manner.

To sum up, the hand truck of the present disclosure is switchable among various states by pivoting one or both of the handle modules 3 relative to the cart base 1, and the length of each of the handle modules 3 is adjustable according to user demand to carry articles with different centers of mass and dimensions. Further, the hand truck can be switched to the collapsed state to obtain a relatively compact profile for storage and can be switched to the platform state to serve as a table. In this way, the present disclosure provides a relatively versatile hand truck as compared to the conventional hand trucks mentioned in the background section.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hand truck, comprising:
   a cart base including a base unit that extends in a longitudinal direction and that has an article-carrying surface adapted to carry an article thereon and a wheel-mounting surface opposite to said article-carrying surface, and a plurality of wheels that are mounted to said wheel-mounting surface;
   two pivot-connectors mounted respectively at two ends of said base unit that are opposite to each other in the longitudinal direction, each of said pivot-connectors including a fixing unit mounted fixedly to said base unit and a movable unit pivotable relative to said fixing unit; and
   two handle modules, each of said handle modules including two side rods that are mounted to said movable unit of a respective one of said pivot-connectors, and a main frame that interconnects said side rods at extremity ends of said side rods away from said movable unit of the respective one of said pivot-connectors, said handle modules being pivotable relative to said base unit such that said hand truck is switchable among a first state, a second state and a platform state;
   wherein when said hand truck is in the first state, said base unit is horizontally positioned, said wheel-mounting surface faces the ground, and one of said handle modules is pivoted relative to said base unit to an upright position where said one of said handle modules is kept upright and is accessible for moving said hand truck;
   wherein when said hand truck is in the second state, said base unit is kept upright, one of said handle modules is pivoted to a spread position where said one of said handle modules extends away from a corresponding one of said pivot-connectors in the longitudinal direction, and the other one of said handle modules is horizontally positioned and cooperates with said article-carrying surface of said base unit to carry the article;
   wherein when said hand truck is in the platform state, said base unit is horizontally positioned, said handle modules are pivoted toward said wheel-mounting surface to a downward extending position where said handle modules are substantially perpendicular to the longitudinal direction so that said base unit is away from the ground; and
   wherein said main frame of each of said handle modules includes two side segments telescopically and respectively connected to said side rods, and a handle segment connected between said side segments.

2. The hand truck as claimed in claim 1, wherein said hand truck is further switchable among a collapsed state, a third state and a fourth state,
   when said hand truck is in the collapsed state, said base unit is horizontally positioned and said handle modules are pivoted toward said article-carrying surface to a collapsed position where said handle modules are overlaid on said article-carrying surface;

when said hand truck is in the third state, said base unit is horizontally positioned, one of said handle modules is pivoted to the spread position and cooperates with said article-carrying surface to carry the article, and the other one of said handle modules is pivoted to the upright position; and when said hand truck is in the fourth state, said base unit is horizontally positioned and said handle modules are both pivoted to the upright position.

3. The hand truck as claimed in claim 2, wherein:

for each of said handle modules in the collapsed position, said side rods and said main frame are horizontally positioned, and are laid on said article-carrying surface;

for each of said handle modules in the upright position, said side rods extend upright from a respective one of said pivot-connectors, and said main frame is away from said article-carrying surface and is accessible for moving said hand truck;

for each of said handle modules in the spread position, said side rods extend away from the other one of said handle modules in the longitudinal direction; and for each of said handle modules in the downward extending position, said side rods extend downward from the respective one of said pivot-connectors, and said side rods and said base unit are supported by said main frame.

4. The hand truck as claimed in claim 3, wherein said fixing unit of each of said pivot-connectors includes two fixed members that are connected fixedly to said base unit and that are spaced apart from each other in a transverse direction transverse to the longitude direction, each of said fixed members being formed with a first open-ended slot, a second open-ended slot, a third open-ended slot and a fourth open-ended slot that are angularly and equidistantly spaced apart from one another, where said first open-ended slots of said fixing members of one of said pivot-connectors face said first open-ended slots of the other one of said pivot-connecting devices, respectively, said movable unit of each of said pivot-connectors including:

two movable elements mounted respectively to said side rods of the respective one of said handle modules, each of said movable elements being formed with an elongated slot including a limiting slot portion and a non-limiting slot portion opposite to said limiting slot portion; and a connecting rod pivotally connecting said movable elements respectively to said fixed members of said pivot-connector;

each of said pivot-connectors further including a limiting unit that includes:

an insertion rod having opposite ends inserted respectively into said elongated slots of said movable elements, and being movable relative to said movable elements between said limiting slot portions and said non-limiting slots portion of said elongated slots; and at least one biasing member connected between said insertion rod and said connecting rod for biasing said opposite ends of said insertion rod respectively toward said limiting slot portions of said elongated slots;

for each of said handle modules in the collapsed position with respect to the respective one of said pivot-connectors, said limiting slot portion of each of said movable elements being aligned with said first open-ended slot of the respective one of said fixed members in the transverse direction, and said opposite ends of said insertion rod engaging respectively said first open-ended slots of said fixed members and extending respectively through said limiting slot portions of said elongated slots so as to prevent said handle module from pivoting relative to said base unit;

for each of said handle modules in the upright position with respect to the respective one of said pivot-connectors, said limiting slot portion of each of said movable elements being aligned with said second open-ended slot of the respective one of said fixed members in the transverse direction, and said opposite ends of said insertion rod engaging respectively said second open-ended slots of said fixed members and extending respectively through said limiting slot portions of said elongated slots so as to prevent said handle module from pivoting relative to said base unit;

for each of said handle modules in the spread position with respect to the respective one of said pivot-connectors, said limiting slot portion of each of said movable elements being aligned with said third open-ended slot of the respective one of said fixed members in the transverse direction, and said opposite ends of said insertion rod engaging respectively said third open-ended slots of said fixed members and extend respectively through said limiting slot portions of said elongated slots so as to prevent said handle module from pivoting relative to said base unit;

for each of said handle modules in the downward extending position with respect to the respective one of said pivot-connectors, said limiting slot portion of each of said movable elements being aligned with said fourth open-ended slot of the respective one of said fixed members in the transverse direction, and said opposite ends of said insertion rod engaging respectively said fourth open-ended slots of said fixed members and extending respectively through said limiting slot portions of said elongated slots so as to prevent said handle module from pivoting relative to said base unit.

5. The hand truck as claimed in claim 1, wherein each of said side segments is formed with a plurality of segment holes spaced apart from one another, and each of said side rods is formed with a rod hole, said side segments to be moved telescopically and respectively relative to said side rods to align a selected one of said segment holes of each of said side segments to said rod hole of a respective one of said side rods in a transverse direction transverse to the longitudinal direction, each of said handle modules further including a positioning unit that is mounted between said side rods and that includes:

a mounting seat connected between said side rods;

two positioning rods spaced apart from one another in the transverse direction, mounted to said mounting seat, and movable between a fixed position, where each of said positioning rods extends into said rod hole of the respective one of said side rods and the selected one of said segment holes of the respective one of said side segments so as to prevent said side segments from moving relative respectively to said side rods, and an adjustable position, where said positioning rods are moved toward each other to disengage from said segment holes to allow said side segments to move respectively relative to said side rods; and a biasing member mounted between said positioning rods for biasing said positioning rods to the fixed position.

6. The hand truck as claimed in claim 5, wherein each of said positioning rods includes an engaging segment extending in the transverse direction and movable between the fixed position and the adjustable position and an operating segment operable to move said engaging segment against a biasing force of said biasing member to the adjustable position.

7. The hand truck as claimed in claim 6, wherein said positioning unit of each of said handle modules further includes a cover mounted on said mounting seat and formed with two cover openings allowing said operating segments of said positioning rods to extend therethrough.

8. The hand truck as claimed in claim 1, wherein an included angle defined between each of said handle modules and said base unit is an obtuse angle when said hand truck is in the platform state.

\* \* \* \* \*